US012603346B2

(12) United States Patent
Paczkowski et al.

(10) Patent No.: US 12,603,346 B2
(45) Date of Patent: Apr. 14, 2026

(54) THERMAL MANAGEMENT SYSTEM FOR RECHARGEABLE BATTERIES

(71) Applicant: Bren-Tronics Defense LLC, Commack, NY (US)

(72) Inventors: Henry Paczkowski, Manhasset Hills, NY (US); Peter J. Burke, East Northport, NY (US); Daniel Sha, Farmingdale, NY (US); Eugene Rudolph, Port Jefferson Station, NY (US); Alan Squillante, Kings Park, NY (US)

(73) Assignee: Bren-Tronics Defense LLC, Commack, NY (US)

( * ) Notice: Subject to any disclaimer, the term of this patent is extended or adjusted under 35 U.S.C. 154(b) by 866 days.

(21) Appl. No.: 17/756,942

(22) PCT Filed: Dec. 9, 2020

(86) PCT No.: PCT/US2020/064070
§ 371 (c)(1),
(2) Date: Jun. 6, 2022

(87) PCT Pub. No.: WO2021/119164
PCT Pub. Date: Jun. 17, 2021

(65) Prior Publication Data
US 2023/0010716 A1     Jan. 12, 2023

Related U.S. Application Data

(60) Provisional application No. 62/946,513, filed on Dec. 11, 2019.

(51) Int. Cl.
*H01M 10/653*     (2014.01)
*H01M 50/224*     (2021.01)
(Continued)

(52) U.S. Cl.
CPC ....... *H01M 10/653* (2015.04); *H01M 50/224* (2021.01); *H01M 50/24* (2021.01);
(Continued)

(58) Field of Classification Search
CPC .. H01M 10/653; H01M 50/24; H01M 50/276; H01M 50/224
See application file for complete search history.

(56) References Cited

U.S. PATENT DOCUMENTS

| | | | |
|---|---|---|---|
| 4,418,127 | A | 11/1983 | Shambaugh |
| 5,158,841 | A | 10/1992 | Mennicke |
| | | (Continued) | |

FOREIGN PATENT DOCUMENTS

| | | |
|---|---|---|
| CN | 201800516 U | 4/2011 |
| DE | 9002249 U1 | 3/1990 |
| | (Continued) | |

OTHER PUBLICATIONS

ISR and Written Opinion for International application No. PCT/US2020/064070 from the ISA/US mailed Mar. 2, 2021.
(Continued)

*Primary Examiner* — Olatunji A Godo
(74) *Attorney, Agent, or Firm* — Keusey & Associates, P.C.

(57) ABSTRACT

A thermal management system (270) for rechargeable secondary batteries having an electrically insulating material (262) lining the interior of a metal case (260). One or more cell packs (24) made of individual cells (12) arranged within end frames (220) is disposed in the metal case (260). A thermally conductive granular filler (264) occupies the interstices (264A) between the individual cells (12) and the space between the cell pack and the electrically insulating material liner (262). The thermally conductive filler (264) decreases the thermal impedance from the cell pack (24) to the exterior (Continued)

surface of the metal case (260) to reduce cell pack temperature and increase battery life

20 Claims, 8 Drawing Sheets

(51) Int. Cl.
| | | |
|---|---|---|
| *H01M 50/24* | (2021.01) | |
| *H01M 50/276* | (2021.01) | |
| *H01M 10/643* | (2014.01) | |

(52) U.S. Cl.
CPC ........ *H01M 50/276* (2021.01); *H01M 10/643* (2015.04); *H01M 2200/10* (2013.01)

(56) References Cited

U.S. PATENT DOCUMENTS

| | | | |
|---|---|---|---|
| 5,735,163 | A | 4/1998 | Sato |
| 8,148,843 | B2 | 4/2012 | Sechrist |
| 8,296,036 | B2 | 10/2012 | Matuszeski et al. |
| 8,389,153 | B2 | 3/2013 | Fujikawa et al. |
| 8,457,860 | B2 | 6/2013 | Matuszeski et al. |
| 8,816,645 | B2 | 8/2014 | Dickinson et al. |
| 9,112,377 | B2 | 8/2015 | Sechrist |
| 9,561,764 | B2 | 2/2017 | Sechrist |
| 9,597,976 | B2 | 3/2017 | Dickinson et al. |
| 10,308,490 | B2 | 6/2019 | Dickinson et al. |
| 2002/0155348 | A1 | 10/2002 | Gitto |
| 2003/0165736 | A1 | 9/2003 | Hiratsuka |
| 2006/0189740 | A1 | 8/2006 | Kamimura et al. |
| 2010/0273034 | A1 | 10/2010 | Hermann et al. |
| 2011/0177366 | A1 | 7/2011 | Nagasake |
| 2011/0240064 | A1 | 10/2011 | Wales |
| 2011/0293998 | A1 | 12/2011 | Sato |
| 2012/0034501 | A1* | 2/2012 | Hermann ............ H01M 10/613 |
| | | | 429/62 |
| 2014/0272509 | A1 | 9/2014 | Thomas et al. |
| 2014/0370354 | A1 | 12/2014 | Yang et al. |
| 2015/0140411 | A1 | 5/2015 | Li |
| 2015/0221914 | A1 | 8/2015 | Page et al. |
| 2017/0214103 | A1 | 7/2017 | Onnerud et al. |
| 2018/0223070 | A1* | 8/2018 | O'Neil ................ H01M 10/052 |
| 2018/0244578 | A1 | 8/2018 | Nishio et al. |
| 2018/0375076 | A1 | 12/2018 | Lampe-Onnerud et al. |
| 2019/0051906 | A1 | 2/2019 | Rhee et al. |
| 2020/0152932 | A1* | 5/2020 | Ozawa ................ H01M 10/653 |
| 2020/0194853 | A1 | 6/2020 | Yoo et al. |
| 2021/0167454 | A1* | 6/2021 | Aoki ................. H01M 10/6567 |
| 2021/0376401 | A1* | 12/2021 | Ando ................ H01M 10/6567 |

FOREIGN PATENT DOCUMENTS

| | | | |
|---|---|---|---|
| DE | 102007010748 | A1 | 8/2008 |
| JP | 2001223034 | A | 8/2001 |
| JP | 2018049697 | A | 3/2018 |
| WO | 2018062172 | A1 | 7/2019 |
| WO | 2020219760 | A1 | 10/2020 |
| WO | 2020219992 | A1 | 10/2020 |
| WO | 2020219993 | A1 | 10/2020 |
| WO | 2020219996 | A1 | 10/2020 |
| WO | 2020220007 | A1 | 10/2020 |

OTHER PUBLICATIONS

EPO, EP Search from corresponding EP 20900614 dated Jun. 4, 2024.

EPO, EP Supplemental Search from corresponding EP 20900614 dated Jun. 4, 2024.

Israel Patent Office, Office Action from corresponding 292998 dated Dec. 9, 2024.

* cited by examiner

THERMAL MANAGEMENT SYSTEM FOR RECHARGEABLE BATTERIES

BACKGROUND OF THE INVENTION

1. Field of the Invention

The invention relates to a thermal management system for rechargeable batteries.

2. The Prior Art

High capacity secondary batteries are formed by packing multiple rechargeable cells into a housing. The packing configuration can occupy a large volume, inadequately protect the cells from impact shock or lead to overheating. For many applications, rechargeable batteries must be able to provide continuous charge/discharge cycles at high current levels and at elevated ambient temperatures. The power dissipation in the cells due to continuous high current cycling can cause the cell-pack temperature to exceed the protection circuit over-temperature threshold, turning off the battery and removing power from the load. Conventional battery designs require significant limits on the charge/discharge current levels to prevent over-temperature shutdown at elevated ambient temperatures. The problem of overheating with potential damage to the battery is particularly severe when utilizing Lithium-Ion cells. A known solution is to reduce the cell current by paralleling additional cells to share the current, which increases the overall battery volume, weight and cost.

Another approach provides a solid support member with cavities shaped to receive individual battery cells. The support member may include an endothermic material as one of its components. For example, U.S. Patent Application Publication 2017/0214103 and U.S. Patent Application Publication 2018/0375076 include alumina trihydrate in a blend of other minerals that is combined with a ceramic matrix or a polymeric binding material, respectively, to form the support member. U.S. Patent Application Publication 2015/0221914 also forms a solid battery housing made from intumescent flame retardant polymer, a blowing agent and optionally a fire retardant such as alumina trihydrate. The above-noted approaches have a major drawback in that the battery configuration revolves around the custom solid support member of solid battery housing. These methods of thermal management cannot be used with existing or legacy battery designs.

Another option set forth in U.S. Patent Application Publication 2002/0155348 proposes to form a battery casing from a flame-retardant thermoplastic including a homopolymer, a copolymer and ammonium polyphosphate and optionally including a filler such as aluminum trihydrate. U.S. Patent Application Publication 2018/0244578 discloses heat conductive materials and methods for producing same. An aluminum starting material is combined with boric acid, phosphoric acid or other similar materials and then fired to produce a film that is applied to a metallic surface of an electronic device. One of the aluminum starting materials may be aluminum hydroxide.

U.S. Patent Application Publication 2006/0189740 combines alumina, alumina hydrate, ammonium chloride and a halogen which is then heat treated and disintegrated to form a particulate filler that is incorporated into a rubber, plastic or glass to increase thermal conductivity. U.S. Pat. No. 8,389,153 combines a lithium-containing active member, aluminum powder and a polymer binder to form the positive electrode of the battery. U.S. Patent Application Publication 2019/0051906 uses alumina powder of a specified bulk density as a coating layer on an electrode or separation membrane of a secondary battery.

Present approaches place thermally conductive materials in custom configurations within thermoplastic battery cases. In other instances, fillers are incorporated into the thermoplastic of the battery case to improve conductivity and provide flame-resistance.

SUMMARY OF THE INVENTION

It is one object of the present invention to provide rechargeable batteries containing lithium-ion (Li-Ion) chemistry within a sealed housing that can be adequately cooled.

It is another object of the invention to provide a thermal management system for secondary batteries.

It is a further object to provide a free flowing thermally conductive filler that can be incorporated into existing and legacy battery designs.

It is another object to provide a metal battery case to increase the dissipation of battery cell heat to the exterior of the battery case.

It is a further object to electrically isolate the battery cells and thermally conductive filler from the metal case while maintaining a low thermal impedance.

While various cells may be used, the apparatus according to the invention is particularly suited for use with Lithium-Ion (Li-Ion) cells. A strip heater is intertwined between the cells in the separation formed by said honeycomb configuration to warm the cells if the ambient temperature is below the specified operating temperature of the cells.

In a further embodiment, a thermal management system for a rechargeable battery is provided by a metal case having an exterior surface and an interior surface lined with an electrically insulating material. A cell pack made from individual battery cells arranged within end frames is disposed in the metal case. A thermally conductive granular filler occupies the interstices between the individual cells and between the cell pack and the electrically insulating material lining. The thermally conductive filler decreases the thermal impedance from the cell pack to the exterior surface of the metal case to reduce cell pack temperature and increase battery life.

The metal case includes a five-sided box and a cover made from one of iron/carbon steel and high temperature steel, wherein all surfaces of the case are galvanized for rust prevention. The metal case includes a five-sided box and a cover made from one of iron/carbon steel and high temperature steel, wherein all surfaces of the case are provided with a highly-crosslinked non-porous coating that protects the metal from biological, radioactive and chemical contamination and withstands chemical cleaning and decontamination without corroding. The highly-crosslinked non-porous coating comprises one of urethane, polyurethane, aliphatic polyurethane, epoxy, epoxy polyamide, epoxy polyamide enamel and combinations thereof.

The cover is sealed to said five-sided box to provide a waterproof metal case that protects the cell pack from moisture intrusion. The metal case includes a pressure relief vent. The pressure relief vent comprises an aperture through the metal case and a film adhered over the aperture. The electrically insulating material lining the interior surface of the metal case comprises a thermoplastic film adhered to said interior surface. The thermoplastic film is one of polyester, nylon and polycarbonate, preferably polyester. In a practical embodiment, the thermoplastic film is between 0.2 mm and 2.0 mm thick, preferably 0.5 mm thick.

The metal case includes metal panels lined with the electrically insulating material that divide the internal space into compartments. The system includes multiple cell packs, each including dozens of cells, wherein each compartment contains one cell pack. Two cell packs are arranged adjacent to each other within the case with one lower end frame of the first cell pack facing one upper end frame of the second cell pack, with the thermally conductive granular filler disposed between the facing end frames. The thermally conductive granular filler comprises alumina trihydrate having a particle size between 2-200 microns which decomposes at 220 degrees C. to release 35% of its weight as water vapor, wherein excessive water vapor pressure will breach the film adhered over the aperture to open the pressure relief vent.

The system may include electrically insulated sleeves which contain the cell packs. The end frames are bonded to the battery cells with epoxy and a silicone-based filler is disposed between the end frames and the metal case to stabilize the cell packs. The thermal management systems allows the battery to be cycled in excess of +70 amps charge and −70 amps discharge whereby the thermally conductive filler decreases thermal impedance from the cell pack to the outside surface of the metal case so that the over-temperature protection circuit is not tripped.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1A:
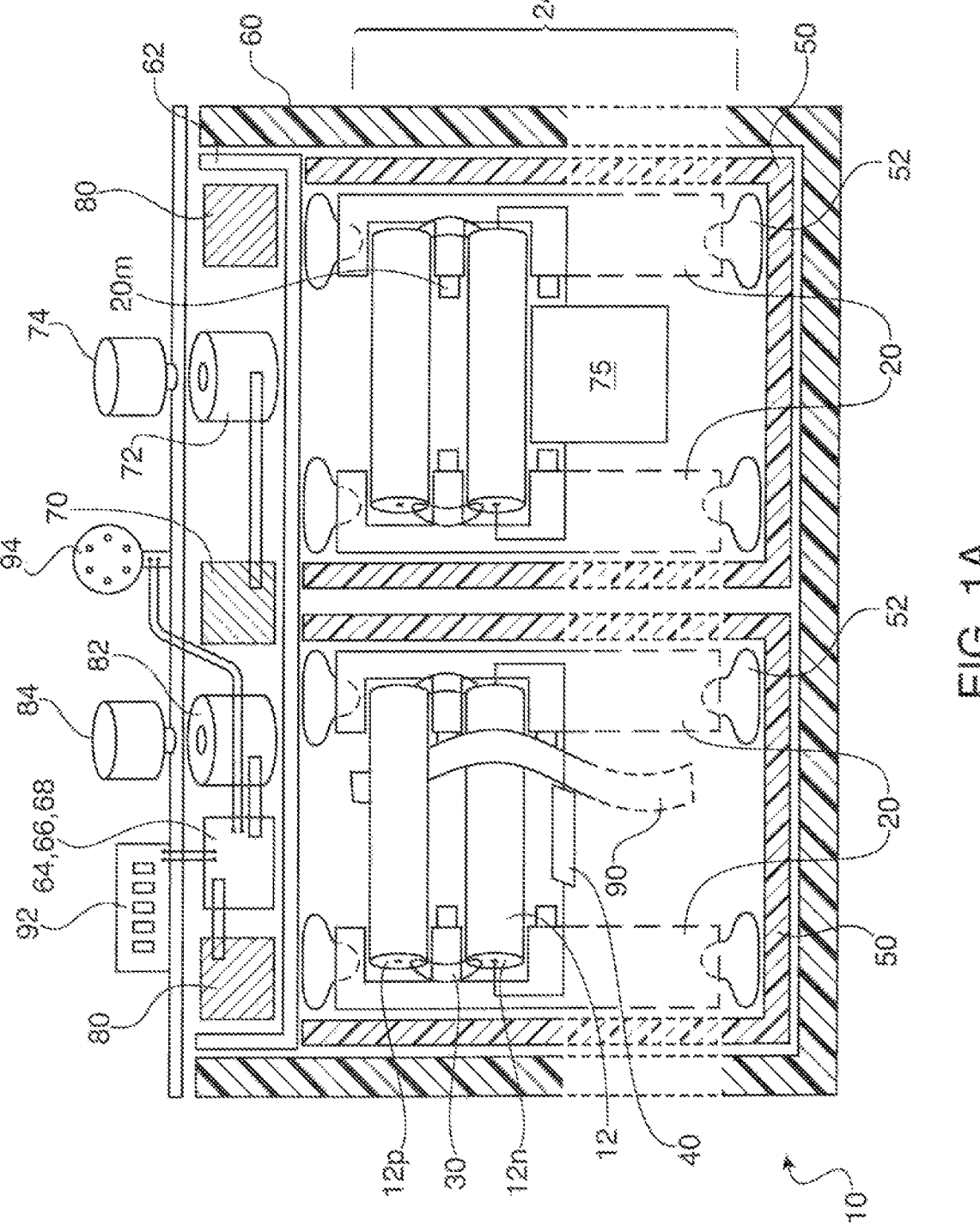
FIG. 1A is an internal view of the battery showing the cells within end frames disposed within pockets inside the housing.

The invention relates to the assembly of cell packs into a housing with integrated control electronics to form a rechargeable battery. The battery, for example, a Lithium-Ion (Li-Ion) Battery, may be useful for vehicle and other high capacity applications. In this application "secondary" batteries have the same meaning as "rechargeable" batteries.

The arrangement of cells is critical to facilitate the assembly process. The series and parallel arrangements of cells are often inefficient to connect in an economical and functional arrangement. The assembly is shown in FIG. 1A as an apparatus 10 for electronically controlling and mechanically coupling cells together within a battery housing 60.

The 18650 cells are arranged into six cell packs. Two cell packs 24 are shown, in a first row, where two additional rows may by added behind the two cell packs shown. The cell packs are then tied in parallel with substantial bus bars. The construction of the cell packs uses two symmetrical honeycomb shaped parts to hold each end of the cylindrical cells (49cells for 24 v and 48 cells for 12 v). The cells 12 and honeycombs, illustrated as end frames 30 get press-fitted and held together by friction fit. The end frame has alignment feature that gradually spread & align all cells at the same time as press-fit process takes place. The honeycomb part holds the cells in relation to each other so as to provide a gap between cells of sufficient size to improve safety by slowing heat conduction from a failed cell and adjacent cells. The gap is also sufficient to allow a strip heater 90 to be snaked between cells providing direct heat to each cell.

Figure 1B:
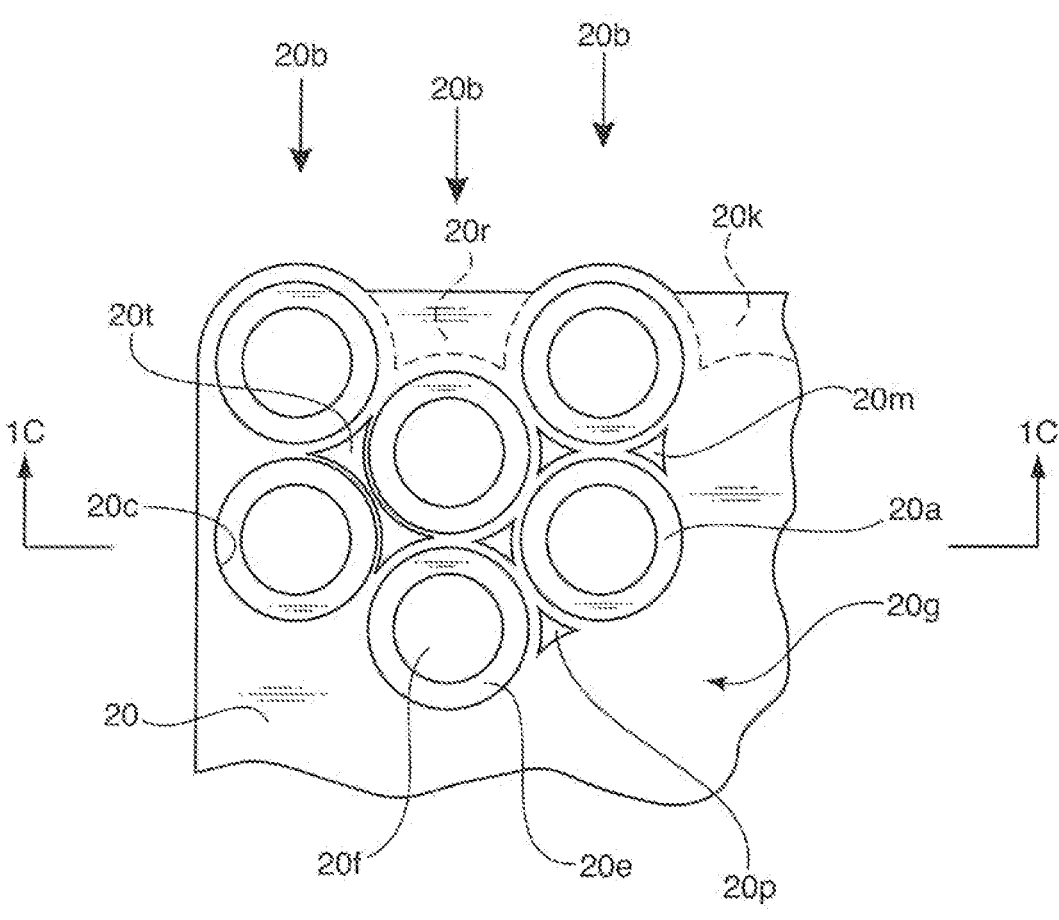
FIG. 1B is an enlarged, top plan view of a section of an end frame.
Figure 1C:
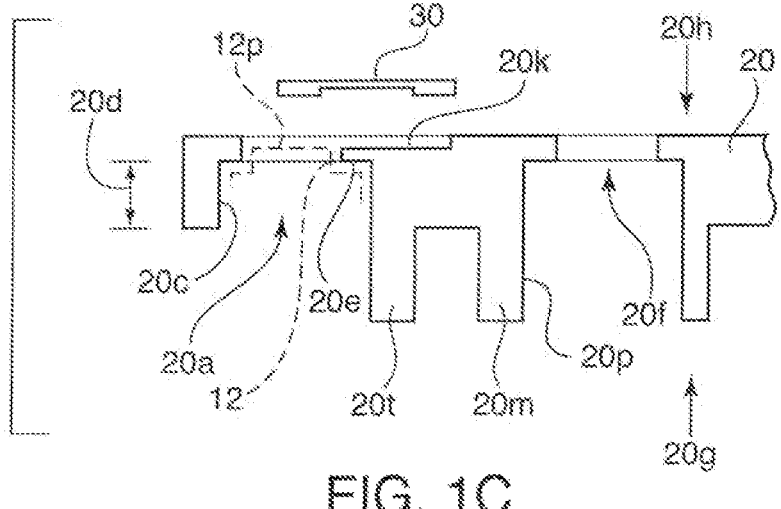
FIG. 1C is a cross-sectional view of the end frame section taken along the line 1C-1C from FIG. 1B.
Figure 2A:
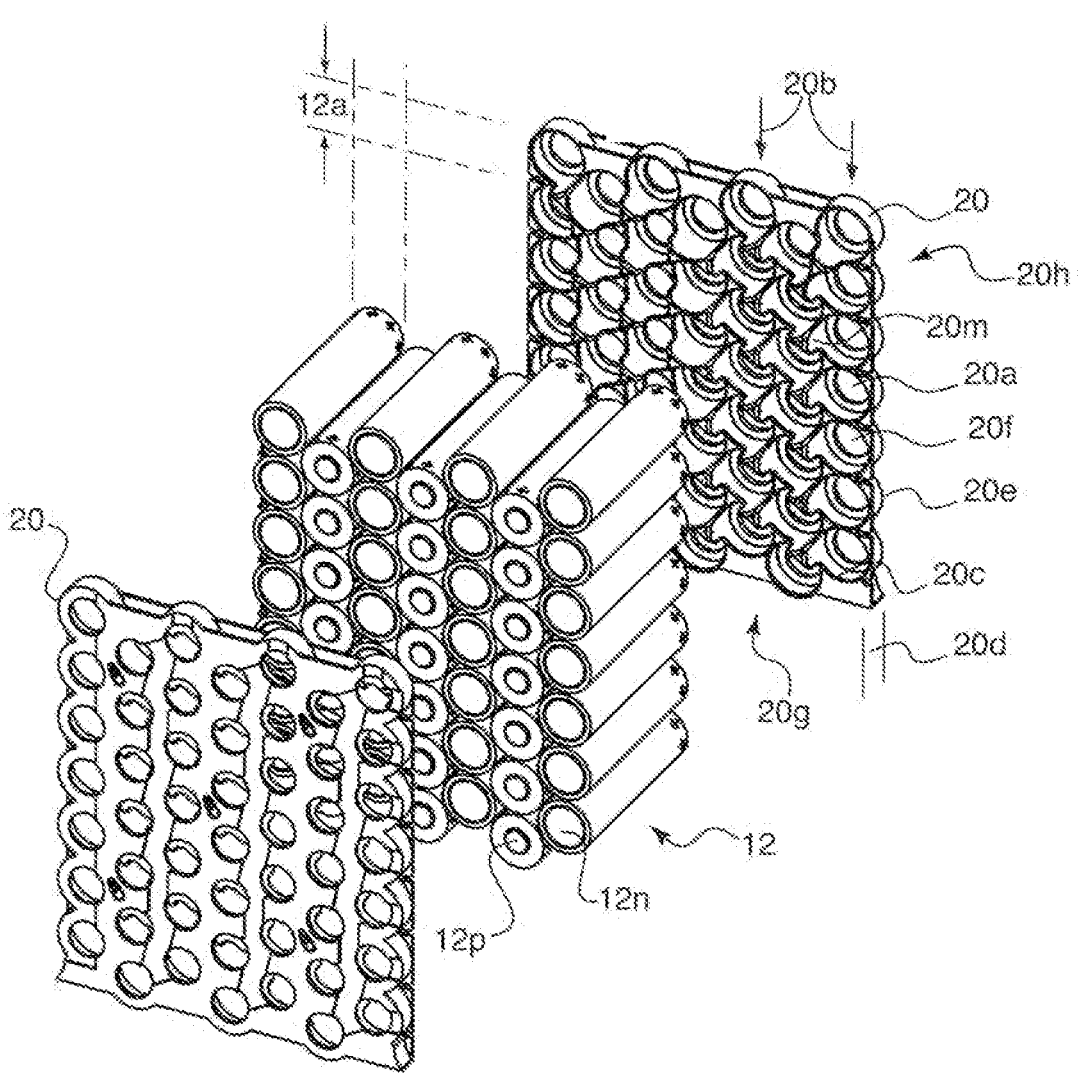
FIGS. 2A, 2B and 2C are exploded views of the cell packs.

Individual battery or electrical cells 12 are arranged within end frames 20 in rows 20b, as shown in FIGS. 1A, 1B and 1C. In each row the cells are places with alternating positive ends 12p and negative ends 12n facing one direction. Connecting tabs 30 are soldered to adjacent cells, connecting a positive end 12p to a negative end 12n, thereby forming a series connection for the cells within the cell pack 24. FIG. 1B shows an enlarged view of one corner of an internal side 20g of end frame 20. The cells have a diameter 12a, with cups 20a being configured slightly larger. A plurality of cups 20a are arranged in rows 20b, that are offset by one-half the cup diameter to create a honeycomb configuration of cells. Each cup 20a includes an annular ring 20c that is a vertical wall in the view of FIG. 1B. The annular ring height 20d is shown in FIGS. 1C and 2A. The lower part of annular ring 20c terminates in a bottom 20e having an aperture 20f formed therein. In between adjacent groups of three cups, there are posts 20m, which extend up, off the page, with tapered top ends to guide the cells into the cups during the press fitting operation. The posts do not have regular triangular cross-sections, rather the posts have three concave sides 20p that conform to the arc of the cups (and slightly larger that the circumference of the cells). At selected locations, the posts are formed between four adjacent cups as double triangles. These double triangular cross section posts 20t may by located in the corners, or in rows through the middle of an end frame to provide additional strength and stiffness to the end frame. FIG. 1B also shows slots 20r at the periphery of end frame 20, in the region where a row 20b is staggered downward.

Tabs 30 connect the cells. The tabs are designed with an offset to provide compliance to reduce stress on the weld joints that provide cell to cell connections. The tabs are shaped to self fixture and align themselves to the cells for improved assembly. The tabs that interconnect cells are configured to provide a series connection between cells while providing parallel connection between groups of cells. After welding, these tabs provide additional mechanical grid-locking support between the honeycomb and cells, further preventing these cells from coming loose from friction fit.

The cell packs are protected by thermal fuses 40. The thermal time constant of the fuses has been increased by the addition of a potting compound 40a around the fuses and onto the cells. This eliminates fuse operation due to thermal rise of the cells that is expected during normal periods of high amperage operation. The fuse will still operate to protect the battery during unexpected high current operation.

Figure 2B:
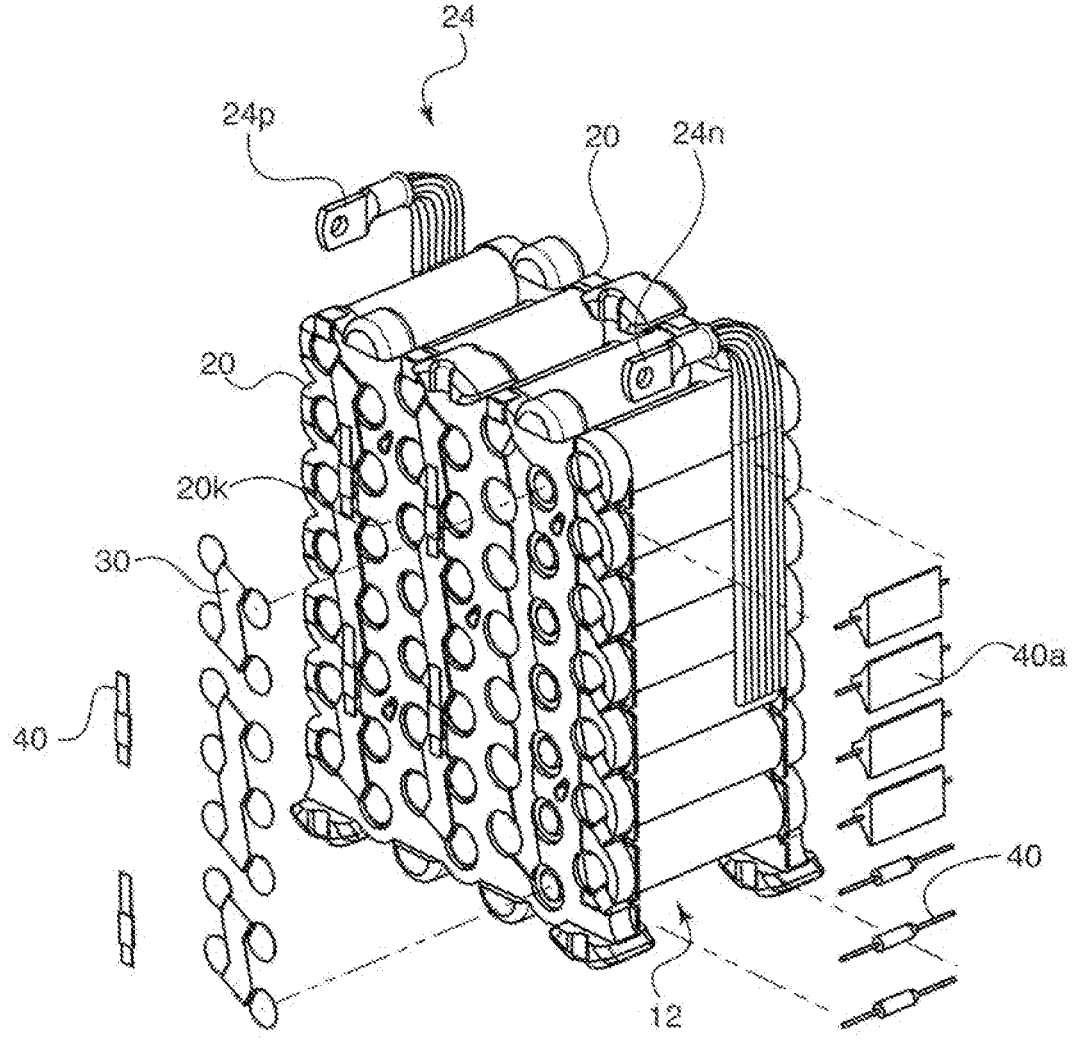

FIG. 2A shows a row of cells with the negative cell contact 12n facing up in one row, and the positive cell contact 12p facing up in the adjacent row. The cells are captured between two end frames 20. FIGS. 1C and 2B show connecting tabs 30 extending from one aperture 20f to the next to connect cells. Connecting tab 30 sits within a shallow channel 20k formed in the external side 20h of each end frame 20.

As can be seen in FIGS. 2B, 2C, 3 and 4A a central negative bus bar 70 is connected to the negative terminal 24n of the cell packs and the output terminal 72 through a monitoring device. Being centrally located allows the length of this bus to be short to minimize the resistance and voltage drop. A ring bus 80 connects the positive terminal 24p of the cell packs to the output terminal through a switch 64. The cell pack arrangement that provides for a short negative bus necessitates a long current path in the positive bus. To balance resistance from the cell packs to the switch the bus is arranged in a ring to provide self balancing multiple current paths to the switch. The bus bars are made primarily from aluminum and electrically couple all of the cell pack terminals of one polarity together. The bus bar has sufficient cross-sectional area to conduct at least 70-80 amps, preferably 90 amps across its length, with the corresponding heat being dissipated through contact to the cover.

Figure 2C:
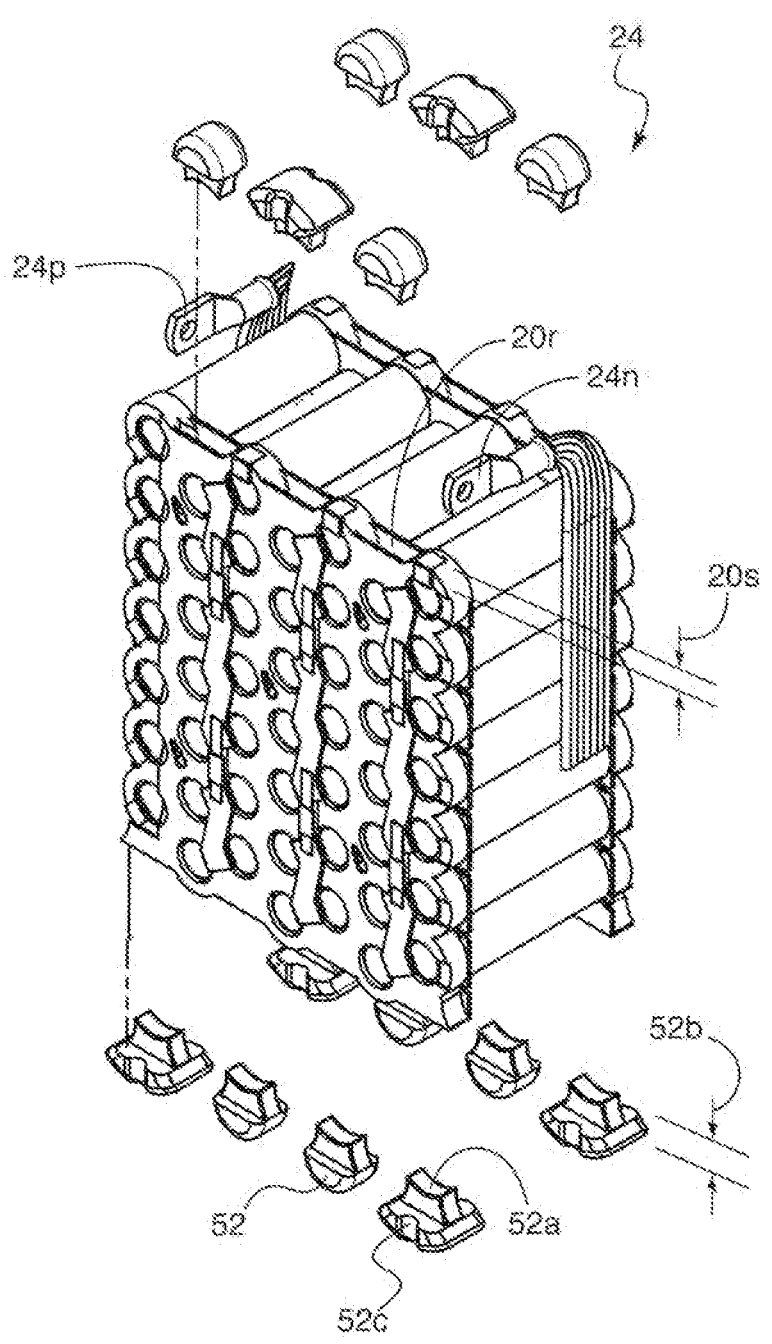
Figure 3:
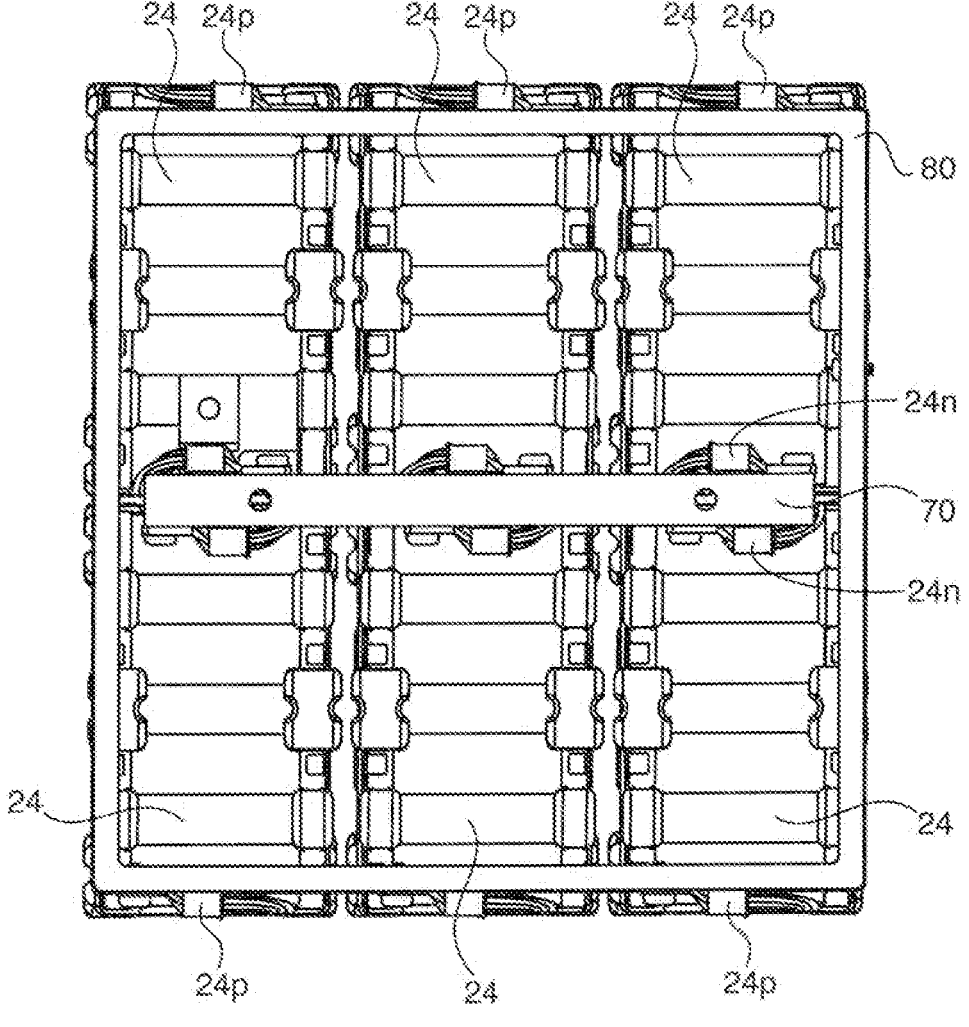
FIG. 3 is a top plan view of the bus bars and cell packs.

The bus bars, control electronics, and other circuitry are contained in and supported by a plastic tray 62 (FIG. 1A). The tray provides mechanical support and physical separation between components. The positive bus bar ring 80 is designed as a continuous rigid rib structure that fits into the tray perimeter and gives it additional structural support. This allows the tray to take random loads of all 6 packs acting on its otherwise very large surface area during vibration and drop with minimal deflection. The ring then passes this load to the very edge of the cover which is its stiffest section, as the perimeter of the cover 62 is shear bonded to the case, or battery housing 60. The cell packs are allowed to move on isolation mounts 52 to absorb shock and vibration to prevent damage to the cell packs. The cell packs are contained in separate five sided pockets 50 in the battery housing with the isolation mounts touching each side. FIG. 1B shows slots 20r located in the edges of end frames 20. FIG. 2C shows the isolation mounts 52 with tabs 52a having a height 52b slightly smaller than the height 20s of the slot 20r. Once installed, the foot of the lower isolation mount 52 extends out and laterally to contact the internal bottom and sides of the five-sided pocket 50 (FIG. 1A). The foot 52c of the upper isolation mount 52 extends out to contact the bottom of tray cover 62, and laterally to contact the internal side of five-sided pocket 50. The tray provides the top surface of the pockets to restrain the upper side of the cell pack shock and vibration isolators.

The output terminals 72, 82 are flat pads with internal threads. They can be converted to standard posts 74, 84. Anti rotation keying is provided in the posts which are held onto the flat pads through a screw though the center of the posts. The positive and negative posts are keyed differently to prevent installation of the wrong post onto the flat pads.

Previously the batteries exterior casing, or outer housing, was formed from plastic. A thermoplastic material for ther- moset polymer could be molded to provide a unitary sealed housing of relatively high strength. For portable batteries for field deployable batteries, a plastic housing provided a reasonable balance between strength and weight while enclosing the battery cells in a nonconductive sheath. In other words the plastic has a low electrical conductivity.

One drawback is that the plastics used as housing materials have a relatively low thermal conductivity. For example, nylon has a thermal conductivity of 0.25 W/(mK), polypropylene has a thermal conductivity of between 0.1 and 0.22 W/(mK), while polycarbonate and PVC have a thermal conductivity of 0.19 W/(mK). In the thermal management system according to the invention, the plastic housing was replaced with a iron/carbon steel alloy having a thermal conductivity at least 1 to 2 orders of magnitude greater than plastic. For example various steel alloys have thermal conductivities ranging between 10 to 60 W/(mK). In a practical embodiment a high temperature steel alloy was form into a battery housing with a combination of right angle folds and welding of additional plates at the corners. All surfaces were then treated to provide rust prevention and environmental protection with Chemical Agent Resistant Coating (CARC) or galvanization. CARC is a highly-cross-linked non-porous coating that protects the metal from biological, radioactive and chemical contamination and withstands chemical cleaning and decontamination without corroding. CARC is applied as one or more layers of highly-crosslinked resins such as urethane, polyurethane, aliphatic polyurethane, epoxy, epoxy polyamide, epoxy polyamide enamel and combinations thereof.

Steel is an unlikely choice for a battery casing since it presents serious threats in the form of electrocution, short circuiting, damage to battery cells and electronics, and fire and explosion hazards. To address these concerns the entire interior of the metal case and lid are lined with an electrically insulating file, for example, a thermoplastic film. The film may be selected from materials such as polyester, nylon and polycarbonate. A suitable film would be about 0.2 mm-2.0 mm, more particularly, 0.25-1 mm thick. A suitable film would posses a dielectric strength between about 250-350 kV/mm (or between about 6,250-8,750 V/mil). In a practical embodiment polyester film about 0.5 mm thick, sold under the tradename Mylar, was adhered to the interior of the case. The film is adhered to the interior surface of the case using a suitable adhesive, for example, 300 LSE manufactured by 3M.

During assembly of the battery, a thermally conductive filler material is introduced within the battery case to surround the internal components. In previous battery constructions, free space surrounded the internal components. This design allows for air cooling by natural convection currents. The thermally conductive filler is a free flowing material that occupies the interstices between the individual cells and occupies the space between the cell pack and the thermoplastic film lining. The thermally conductor filler is capable of conforming to any open spaces that are present in the batteries interior. The thermally conductive filler is chemically inert and possesses arc resistance. The thermally conductive filler has a fine granular consistency, for example, granules having a median particle size between 2.0 and 200 microns. A suitable filler will possess a thermal conductivity between about 10-35 W/m·K (or about 70-240 BTU·in/ft$^2$·hr·F.). In addition, a suitable filler will possess a dielectric strength between about 10 and 20 kV/mm (or about 250-500 V/mil).

In a practical embodiment alumina trihydrate (Al$_2$O$_3$·3H$_2$O) having a median particle size of 60-100 microns, preferably 80 microns was introduced into the free space within the battery. The battery was vibrated to allow the granules to settle into any of the smaller spaces and then topped off with additional granules until the desired level of packing was achieved. As described above 48 or 49 cylindrical cells are arranged within two end frames in a honeycomb configuration to form each cell pack. One, two or more pairs of cell packs may be provided based on the load power requirements. The thermally conductive filler then occupies the gaps in between the honeycombed configured cells. Alumina Trihydrate endothermically decomposes at 220 degrees C. (430 degrees F.) to release 35% of its weight as water vapor; wherein excessive water vapor pressure will breach the pressure relief vent.

A high temperature steel cover also lined with thermoplastic film is secured to the top open end of the casing to form a water tight housing. Emergency high pressure venting is provided. The vents allow the housing to remain watertight during 50,000 foot elevation pressure changes. In the case of a runaway cell or other malfunction that produces excessive pressure, the vent covering would rupture allowing the internal space to depressurize.

Prior to the introduction of the thermally conductive filler in to the case, the cell packs may be place within five-sided open boxes or insulating sleeves. Certain portions of the cell pack may be stabilized with a silicone-based filler. For example the bottom of the cell pack, or corners or edges of the cell pack, may include the silicone-based filler. The Silicone-based filler provides a cushion between the cell pack and the metal case which is less forgiving than the previous polypropylene case. A suitable epoxy for use in electronic equipment may also be introduced in certain areas of the cell pack to encase these cell connectors and electronics. In addition the silicone-based filler and epoxy can occupy certain volumes of space where it is desirous to exclude the thermally conductive filler granules.

The proposed solution utilizes a thermally conductive filler to reduce the cell pack temperature by decreasing the thermal impedance from the given cell pack volume to the outside surface of the metal battery housing. While previous plastic battery housings were made from low conductive material, the metal battery housing according to the invention has high conductivity and functions like a radiator to dissipate heat transmitted from the cells through the thermally conductive filler to the exterior.

Figure 4A:
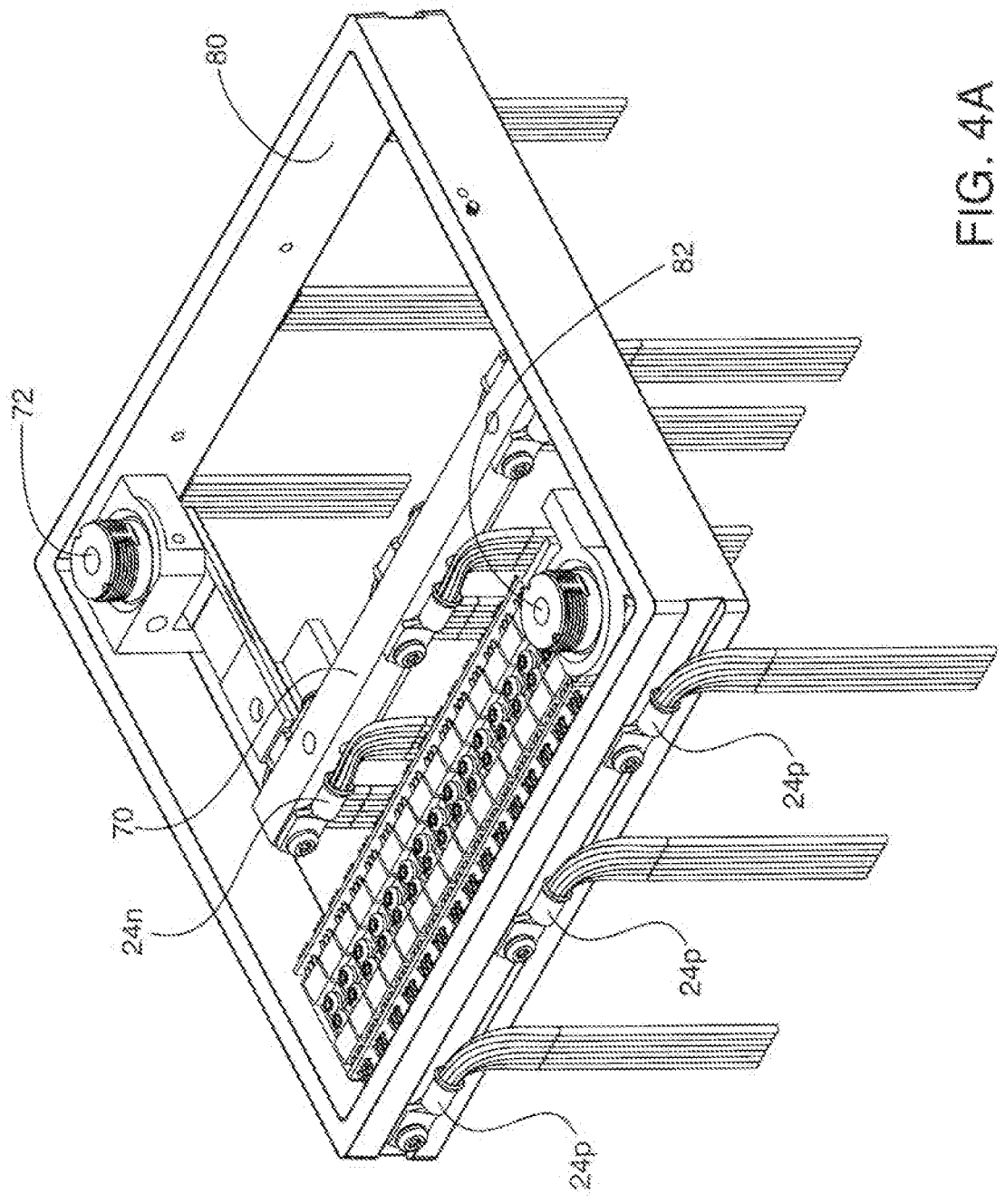
FIG. 4A is a perspective view of the bus bars without the cell packs.
Figure 4B:
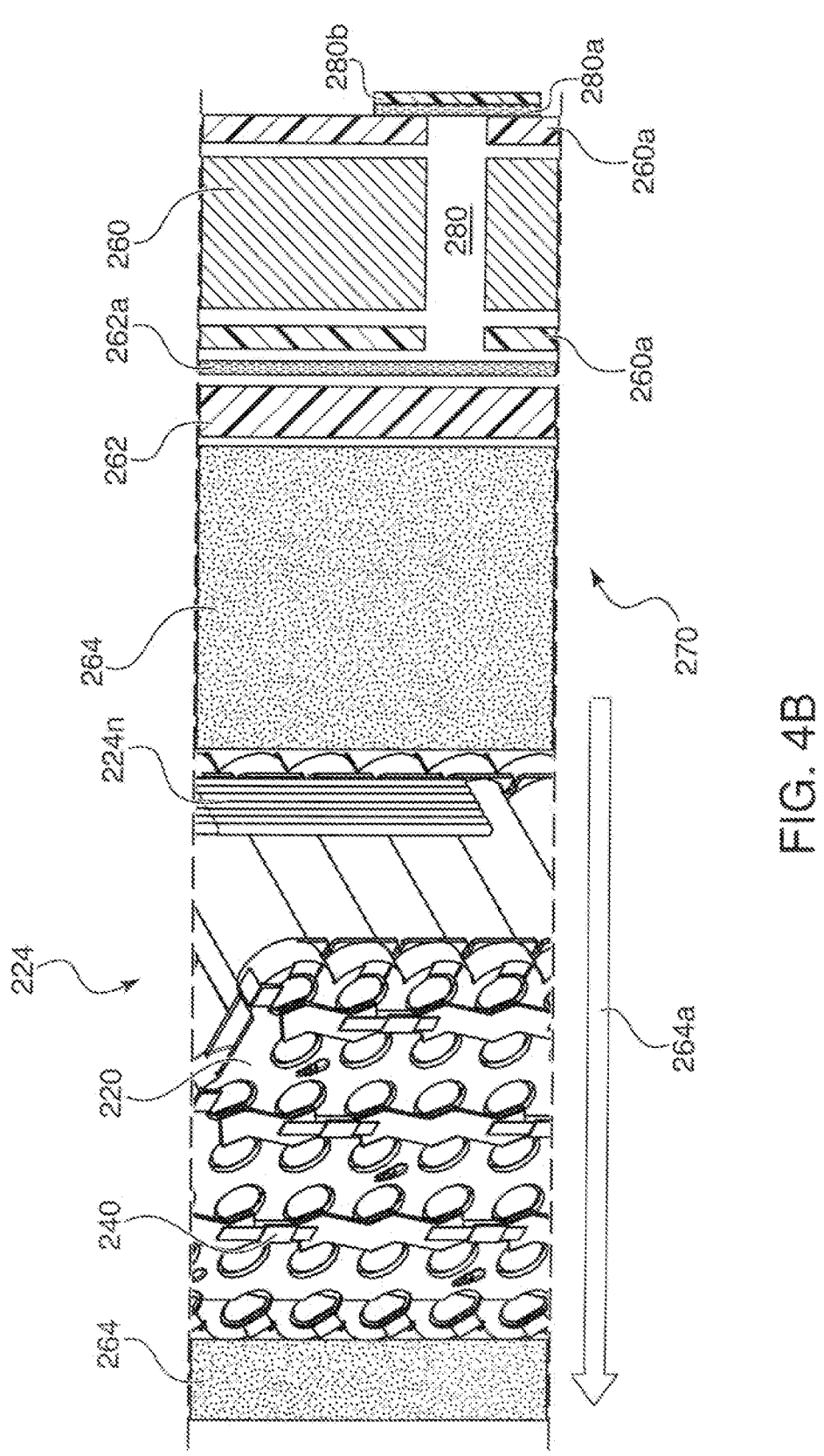
FIG. 4B is a cross-sectional view of the case, insulation and granular filler of the thermal management system.

FIG. 4B is a cross-sectional view illustrating an embodiment of a thermal management system 270. The steel casing 260 forms the exterior housing of the battery. CARC or galvanization 260$a$ is applied to both interior and exterior surfaces of steel casing 260. CARC would be intimately bonded to the surface of the casing, however a small gap is included in the drawing for the sake of clarity. An insulating film 262 is adhered to interior surface of the casing with adhesive 262$a$. A cell pack 224 is shown with its negative terminal 224$n$ and end frame 220. Individual electrical battery cells are arranged within the end frame 220. Groups of cells are protected by thermal fuses 240. A sleeve may be provided around cell pack 224, although not illustrated for the sake of clarity. Alternatively, metal panels lined with electrically insulating material divide the internal space into compartments. A thermally conductive filler 264 is disposed within the case to fill the free space between cell pack 224 and insulating liner 262. Additional thermally conductive filler 264 occupies all of the interstices between the individual cells of cell pack 224 as indicated by the filling arrow 264$a$.

A vent 280 is formed as an aperture through the metal case 260. One or both sides of the aperture may be covered with a film 262, 280$b$ attached to the case with adhesive 262$a$, 280$a$. Accordingly, the combination of label material and adhesive strength will keep the vent holes closed during altitude changes up to 50,000 feet, when the atmospheric pressure varies between about 30 inHg and 3 inHg and back to 30 inHg. In addition, the combination of label material and adhesive strength will open the vent holes if the internal pressure approaches the design limits of the housing. The combination of label material and adhesive strength will keep the vent holes closed under 10× pressure changes, and will open the vent holes under 15× pressure changes. A pressure sensor may be provided to monitor internal pressure and coupled to software that will open circuit breakers to disconnect the bus bars under 15× pressure changes. The size of the film covering the aperture is dimensioned to withstand the elevation pressure change, yet rupture upon the build-up of excess pressure within the case due to a runaway cell or other malfunction.

The case is made from high temperature steel of a sufficient thickness to remain intact while damaged cells burn out and ignite neighboring cells in a domino effect and simultaneously prevent the cells or other internal battery components from ejecting as secondary projectiles. In this application, high temperature means a steel alloy that can withstands temperatures up to about 500 degrees C. (930 degrees F.). Such steels contain base materials of nickel, iron or cobalt and combinations thereof. Nickel type materials will contain primarily nickel with lesser amounts of iron and cobalt, with the base materials collectively making up more than 50% of the alloy. Cobalt type materials will contain primarily cobalt with lesser amounts of nickel and iron, with the base materials collectively making up more than 50% of the alloy. Iron type materials will contain primarily iron with lesser amounts of nickel and cobalt, with the base materials collectively making up more than 50% of the alloy. Typically, chromium is added in an amount between 1-30%. Molybdenum is optionally added in amounts up to 28%. Other materials are optionally added in trace amounts up to 15%, namely, tungsten, manganese, silicon, niobium, aluminum, titanium, carbon, boron, zirconium and copper and combinations thereof.

The primary advantage of the proposed approach is the ability to continuously charge and discharge the battery at significantly higher rates at elevated ambient temperatures. Additionally the reduced cell temperature provides an increase in battery cycle life. The thermal management system can be applied to any battery having a cell pack contained in a battery housing in order to improve high-rate high-temperature performance. As a specific example, the thermal management system has been applied to a 6T battery. Previously the internal space of the battery was air cooled and housed in a polypropylene case. Maximum cycling performance was rated at +60 amps charging and −60 amps discharging at an ambient temperature of 38° C. Utilizing the thermal filler and metal case according to the thermal management system of the invention, the battery can be continuously cycled at more than 70 or 80 amps, more particularly+90 amps charging and −90 amps discharging at an ambient temperature of 50° C., providing a significant improvement in performance capability.

Having described preferred embodiments (which are intended to be illustrative and not limiting) for materials, configurations and assembly, it is noted that modifications and variations can be made by persons skilled in the art in light of the above teachings. The secondary batteries can contain different quantities of cell packs and individual cells. Various materials and coatings may be combined in alternate configurations to achieve the same purpose. It is therefore to be understood that changes may be made in the particular embodiments of the invention disclosed which are within the scope and spirit of the invention.

What is claimed is:

1. A thermal management system for a rechargeable battery comprising:

a metal case having an exterior surface and an interior surface lined with an electrically insulating material;

a cell pack made from individual battery cells arranged within end frames and disposed in said metal case on isolation mounts which support and space the cell packs from the interior surface; and a thermally conductive granular filler in the form of free-flowing granules introduced into the free spaces within the battery to occupy the interstices between said individual cells and occupy the space between the cell pack and the electrically insulating material lining, wherein said thermally conductive filler decreases the thermal impedance from the cell pack to the exterior surface of the metal case to reduce cell pack temperature and increase battery life.

2. The thermal management system according to claim 1, wherein said metal case includes a five-sided box and a cover made from one of iron/carbon steel and high temperature steel, wherein all surfaces of the case are galvanized for rust prevention.

3. The thermal management system according to claim 1, wherein said metal case includes a five-sided box and a cover made from one of iron/carbon steel and high temperature steel, wherein all surfaces of the case are provided with a highly-crosslinked non-porous coating that protects the metal from biological, radioactive and chemical contamination and withstands chemical cleaning and decontamination without corroding.

4. The thermal management system according to claim 3, wherein said highly-crosslinked non-porous coating is selected from the group consisting of urethane, polyurethane, aliphatic polyurethane, epoxy, epoxy polyamide, epoxy polyamide enamel and combinations thereof.

5. The thermal management system according to claim 3, wherein said cover is sealed to said five-sided box to provide a waterproof metal case that protects the cell pack from moisture intrusion, wherein the metal case includes a pressure relief vent.

6. The thermal management system according to claim 5, wherein said pressure relief vent comprises an aperture through the metal case and a film adhered over the aperture.

7. The thermal management system according to claim 1, wherein said electrically insulating material lining said interior surface of said metal case comprises a thermoplastic film adhered to said interior surface.

8. The thermal management system according to claim 7, wherein said thermoplastic film is selected from the group consisting of polyester, nylon and polycarbonate.

9. The thermal management system according to claim 8, wherein said thermoplastic film is between 0.2 mm and 2.0 mm thick.

10. The thermal management system according to claim 1, wherein said metal case includes metal panels lined with the electrically insulating material that divide an internal space of the metal case into compartments, wherein said system includes multiple cell packs, each including dozens of cells, wherein each compartment contains one cell pack.

11. The thermal management system according to claim 1, wherein two cell packs are arranged adjacent to each other within the case with one lower end frame of the first cell pack facing one upper end frame of the second cell pack, wherein the thermally conductive granular filler is disposed between the facing end frames.

12. The thermal management system according to a claim 6, wherein said thermally conductive granular filler comprises alumina trihydrate having a particle size between 2-200 microns which decomposes when a battery cell malfunction heats the alumina trihydrate above around 220 degrees C. to release up to 35% of its weight as water vapor, wherein excessive water vapor pressure will breach the film adhered over the aperture to open the pressure relief vent.

13. The thermal management system according to claim 1, wherein said system includes electrically insulated sleeves which contain the cell packs.

14. The thermal management system according to claim 1, wherein said end frames are bonded to the battery cells with epoxy and wherein a silicone-based filler is disposed between the end frames and the metal case to stabilize the cell packs.

15. The thermal management system according to claim 1, wherein the thermal management system allows the battery to be cycled in excess of +70 amps charge and –70 amps discharge whereby the thermally conductive granular filler decreases thermal impedance from the cell pack to the outside surface of the metal case so that an over-temperature protection circuit is not tripped.

16. The thermal management system according to claim 1, wherein the thermally conductive granular filler has a particle size between 2-200 microns which decomposes when a battery cell malfunction heats the thermally conductive granular filler above around 220 degrees C. to release up to 35% of its weight as water vapor.

17. The thermal management system according to claim 16, wherein the electrically insulating material comprises a thermoplastic film.

18. The thermal management system according to claim 17, wherein the metal case comprises a waterproof sealed steel case provided with a non-porous coating that protects the metal from biological, radioactive and chemical contamination and withstands chemical cleaning and decontamination without corroding.

19. The thermal management system according to claim 18, wherein the steel case is galvanized and the non-porous coating comprises a highly-crosslinked resin coating.

20. The thermal management system according to claim 19, wherein the thermally conductive granular filler comprises alumina trihydrate.

*　*　*　*　*